(12) United States Patent
Esaka et al.

(10) Patent No.: US 7,839,116 B2
(45) Date of Patent: Nov. 23, 2010

(54) POWER SUPPLY DEVICE, CONTROL METHOD OF POWER SUPPLY DEVICE, AND MOTOR VEHICLE EQUIPPED WITH POWER SUPPLY DEVICE

(75) Inventors: Toshinori Esaka, Nishikamo-gun (JP); Nobuyuki Okabe, Toyota (JP); Osamu Komeda, Mishima (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 711 days.

(21) Appl. No.: 11/887,572

(22) PCT Filed: Apr. 14, 2006

(86) PCT No.: PCT/JP2006/308361

§ 371 (c)(1), (2), (4) Date: Oct. 1, 2007

(87) PCT Pub. No.: WO2006/112510

PCT Pub. Date: Oct. 26, 2006

(65) Prior Publication Data

US 2009/0015193 A1 Jan. 15, 2009

(30) Foreign Application Priority Data

Apr. 15, 2005 (JP) ............................. 2005-118205

(51) Int. Cl.
*H02J 7/00* (2006.01)
*H02J 1/12* (2006.01)
*H05K 7/14* (2006.01)
*F02N 11/08* (2006.01)
*B60K 1/00* (2006.01)

(52) U.S. Cl. .................... 320/103; 320/104; 320/107; 320/117; 320/118; 320/120; 307/46; 307/64; 307/66; 307/149; 180/65.1; 123/179.3

(58) Field of Classification Search ................. 320/103
See application file for complete search history.

(56) References Cited

U.S. PATENT DOCUMENTS

| | | | | |
|---|---|---|---|---|
| 5,883,496 | A * | 3/1999 | Esaki et al. ................. | 320/132 |
| 6,617,826 | B2 * | 9/2003 | Liao et al. ................... | 320/118 |
| 2003/0098185 | A1 * | 5/2003 | Komeda et al. ............. | 180/65.2 |
| 2003/0102845 | A1 * | 6/2003 | Aker et al. .................. | 320/139 |
| 2004/0207205 | A1 | 10/2004 | Kikuchi et al. | |

FOREIGN PATENT DOCUMENTS

DE  44 37 876 A1  5/1995

(Continued)

*Primary Examiner*—Edward Tso
*Assistant Examiner*—Yalkew Fantu
(74) *Attorney, Agent, or Firm*—Oliff & Berridge, PLC

(57) ABSTRACT

In a power supply device of the invention, when the state of charge SOC1 of a low-voltage battery is lower than a discharging reference value Shi1 below a full charge level and when the state of charge SOC2 of a high-voltage battery is not lower than a discharging reference value Slow2 at a system-off time, the low-voltage battery is charged close to its full charge level with the electric power supplied from the high-voltage battery. The lead acid battery used for the low-voltage battery has the high potential for deterioration in the continuously low state of charge SOC. The lithium secondary battery used for the high-voltage battery has the high potential for deterioration in the continuously high state of charge SOC. The charge of the low-voltage battery in combination with the discharge of the high-voltage battery enables both the low-voltage battery and the high-voltage battery to have respective favorable states of charge with little potentials for deterioration. The technique of the invention thus effectively prevents quick deterioration of both the low-voltage battery and the high-voltage battery.

5 Claims, 4 Drawing Sheets

FOREIGN PATENT DOCUMENTS

| | | |
|---|---|---|
| EP | 0 807 546 A1 | 11/1997 |
| EP | 1 468 864 A2 | 10/2004 |
| JP | A-08-205312 | 8/1996 |
| JP | A-11-164494 | 6/1999 |
| JP | A-2002-58175 | 2/2002 |
| JP | A-2002-313412 | 10/2002 |
| JP | A-2003-92805 | 3/2003 |
| JP | A-2004-031012 | 1/2004 |
| JP | A-2004-031013 | 1/2004 |

* cited by examiner

POWER SUPPLY DEVICE, CONTROL METHOD OF POWER SUPPLY DEVICE, AND MOTOR VEHICLE EQUIPPED WITH POWER SUPPLY DEVICE

TECHNICAL FIELD

The present invention relates to a power supply device, a control method of the power supply device, and a motor vehicle equipped with the power supply device. More specifically the invention pertains to a power supply device that receives an external supply of electric power and supplies electric power to an external electric power-consuming apparatus, a control method of such a power supply device, and a motor vehicle equipped with such a power supply device.

BACKGROUND ART

One proposed power supply device determines a voltage adjustment condition of plural cells, which are arranged in series to construct a battery assembly, according to the charge levels or the states of charge SOC of the respective cells, and actually adjusts the voltages of the respective cells in the battery assembly on the basis of the determined voltage adjustment condition (see, for example, Japanese Patent Laid-Open Gazette No. 2004-31012). Such voltage adjustment equalizes the voltages of the respective cells in the battery assembly.

DISCLOSURE OF THE INVENTION

The prior art power supply device does not include multiple batteries having different characteristics. The adjustment of the states of charge SOC of such multiple batteries may be undesirable under some conditions. In a power supply device including multiple batteries of different characteristics, it is desirable to adjust the state of charge SOC of each battery and to charge or discharge the battery according to the characteristic of the battery.

In a power supply device including multiple batteries of different characteristics, a control method of such a power supply device, and a motor vehicle equipped with such a power supply device, the object of the invention is to make the state of each battery have a favorable state of charge according to the characteristic of the battery. In the power supply device including multiple batteries of different characteristics, the control method of the power supply device, and the motor vehicle equipped with the power supply device, the object of the invention is also to prevent quick deterioration of each battery. In the power supply device including multiple batteries of different characteristics, the control method of the power supply device, and the motor vehicle equipped with the power supply device, the object of the invention is further to ensure exertion of good performance of each battery.

At least part of the above and the other related objects is attained by a power supply device, a control method of the power supply device, and a motor vehicle equipped with the power supply device of the invention having the configurations discussed below.

The present invention is directed to a power supply device that receives an external supply of electric power and supplies electric power to an external electric power-consuming apparatus. The power supply device includes: a first battery that is chargeable and dischargeable and has a first characteristic; a second battery that is chargeable and dischargeable and has a second characteristic different from the first characteristic; a voltage adjustment structure that adjusts a first voltage as a voltage of a first voltage system connected with the first battery and a second voltage as a voltage of a second voltage system connected with the second battery; a first state detection unit that detects a state of the first battery; and a control module that, under condition of no external supply of electric power, controls the voltage adjustment structure based on the state of the first battery detected by the first state detection unit to cause transmission of electric power between the first battery and the second battery and make the first battery have a favorable state of charge.

Under condition of no external supply of electric power, the power supply device of the invention adjusts the first voltage and the second voltage, based on the detected state of the first battery. The first voltage represents the voltage of the first voltage system connected with the first battery that is chargeable and dischargeable and has the first characteristic. The second voltage represents the voltage of the second voltage system connected with the second battery that is chargeable and dischargeable and has the second characteristic different from the first characteristic. The adjustment of the first voltage and the second voltage aims to cause transmission of electric power between the first battery and the second battery and make the first battery have the favorable state of charge. This arrangement of the invention enables the first battery to have the favorable state of charge.

In one preferable embodiment of the invention, the power supply device further includes a second state detection unit that detects a state of the second battery. The control module controls the voltage adjustment structure based on the state of the first battery detected by the first state detection unit and the state of the second battery detected by the second state detection unit to cause transmission of electric power between the first battery and the second battery and make the first battery have a favorable state of charge. This arrangement enables the first battery to have the better state of charge by taking into account the detected state of the second battery.

In one preferable application of the power supply device of this embodiment having the second state detection unit, the control module controls the voltage adjustment structure based on the state of the first battery detected by the first state detection unit and the state of the second battery detected by the second state detection unit to cause transmission of electric power between the first battery and the second battery and make both the first battery and the second battery have respective favorable states of charge. This arrangement enables both the first battery and the second battery to have the respective favorable states of charge. In this application, the second characteristic may be quick deterioration in a high state of charge having a high level of dischargeable electric power. In this case, the control module controls the voltage adjustment structure to shift the state of the second battery to a lower state of charge. This arrangement effectively prevents quick deterioration of the second battery.

In the power supply device of the invention, the first characteristic may be quick deterioration in a low state of charge having a low level of dischargeable electric power. In this case, the control module controls the voltage adjustment structure to shift the state of the first battery to a higher state of charge. This arrangement effectively prevents quick deterioration of the first battery.

Further, in the power supply device of the invention, the first characteristic may be quick deterioration in a high state of charge having a high level of dischargeable electric power. In this case, the control module controls the voltage adjustment structure to shift the state of the first battery to a lower state of charge. This arrangement effectively prevents quick deterioration of the first battery.

In the power supply device of the invention, the first characteristic may be recovery of battery performance by a shift between a high state of charge having a high level of dischargeable electric power and a low state of charge having a low level of dischargeable electric power. In this case, the control module controls the voltage adjustment structure to recover the battery performance of the first battery. This arrangement ensures exertion of the good performance of the first battery.

The present invention is also directed to a motor vehicle. The motor vehicle includes: an internal combustion engine; a generator that consumes output power of the internal combustion engine and generates electric power; and a power supply device that receives a supply of the electric power generated by the generator and supplies electric power to an external electric power-consuming apparatus. The power supply device includes: a first battery that is chargeable and dischargeable and has a first characteristic; a second battery that is chargeable and dischargeable and has a second characteristic different from the first characteristic; a voltage adjustment structure that adjusts a first voltage as a voltage of a first voltage system connected with the first battery and a second voltage as a voltage of a second voltage system connected with the second battery; a first state detection unit that detects a state of the first battery; and a control module that, under condition of no external supply of electric power, controls the voltage adjustment structure based on the state of the first battery detected by the first state detection unit to cause transmission of electric power between the first battery and the second battery and make the first battery have a favorable state of charge.

Under condition of no supply of electric power generated by the generator that consumes the output power of the internal combustion engine for power generation, the motor vehicle of the invention adjusts the first voltage and the second voltage, based on the detected state of the first battery. The first voltage represents the voltage of the first voltage system connected with the first battery that is chargeable and dischargeable and has the first characteristic. The second voltage represents the voltage of the second voltage system connected with the second battery that is chargeable and dischargeable and has the second characteristic different from the first characteristic. The adjustment of the first voltage and the second voltage aims to cause transmission of electric power between the first battery and the second battery and make the first battery have the favorable state of charge. This arrangement of the invention enables the first battery to have the favorable state of charge and ensures the adequate supply of electric power to a motor that outputs driving power for driving the motor vehicle.

In the motor vehicle of the invention, the power supply device may further include a second state detection unit that detects a state of the second battery, and the control module may control the voltage adjustment structure based on the state of the first battery detected by the first state detection unit and the state of the second battery detected by the second state detection unit to cause transmission of electric power between the first battery and the second battery and make the first battery have a favorable state of charge. In this case, the control module may control the voltage adjustment structure based on the state of the first battery detected by the first state detection unit and the state of the second battery detected by the second state detection unit to cause transmission of electric power between the first battery and the second battery and make both the first battery and the second battery have respective favorable states of charge. Further, the second characteristic may be quick deterioration in a high state of charge having a high level of dischargeable electric power, and the control module may control the voltage adjustment structure to shift the state of the second battery to a lower state of charge.

In the motor vehicle of the invention, the first characteristic may be quick deterioration in a low state of charge having a low level of dischargeable electric power, and the control module may control the voltage adjustment structure to shift the state of the first battery to a higher state of charge. Further, the first characteristic may be quick deterioration in a high state of charge having a high level of dischargeable electric power, and the control module may control the voltage adjustment structure to shift the state of the first battery to a lower state of charge. Furthermore, the first characteristic may be recovery of battery performance by a shift between a high state of charge having a high level of dischargeable electric power and a low state of charge having a low level of dischargeable electric power, and the control module may control the voltage adjustment structure to recover the battery performance of the first battery.

The present invention is also directed to a control method of a power supply device that receives an external supply of electric power and supplies electric power to an external electric power-consuming apparatus. The power supply device includes: a first battery that is chargeable and dischargeable and has a first characteristic; a second battery that is chargeable and dischargeable and has a second characteristic different from the first characteristic; and a voltage adjustment structure that adjusts a first voltage as a voltage of a first voltage system connected with the first battery and a second voltage as a voltage of a second voltage system connected with the second battery. Under condition of no external supply of electric power, the control method controls the voltage adjustment structure to cause transmission of electric power between the first battery and the second battery and make the first battery have a favorable state of charge.

Under condition of no external supply of electric power, the control method of the invention adjusts the first voltage and the second voltage, based on the detected state of the first battery. The first voltage represents the voltage of the first voltage system connected with the first battery that is chargeable and dischargeable and has the first characteristic. The second voltage represents the voltage of the second voltage system connected with the second battery that is chargeable and dischargeable and has the second characteristic different from the first characteristic. The adjustment of the first voltage and the second voltage aims to cause transmission of electric power between the first battery and the second battery and make the first battery have the favorable state of charge. This arrangement of the invention enables the first battery to have the favorable state of charge.

In the control method of the invention, the control method may control the voltage adjustment structure based on a state of the first battery and a state of the second battery to cause transmission of electric power between the first battery and the second battery and make the first battery have the favorable state of charge. Also, the control method may control the voltage adjustment structure based on the state of the first battery detected by the first state detection unit and the state of the second battery detected by the second state detection unit to cause transmission of electric power between the first battery and the second battery and make both the first battery and the second battery have respective favorable states of charge.

BEST MODES OF CARRYING OUT THE INVENTION

Figure 1:
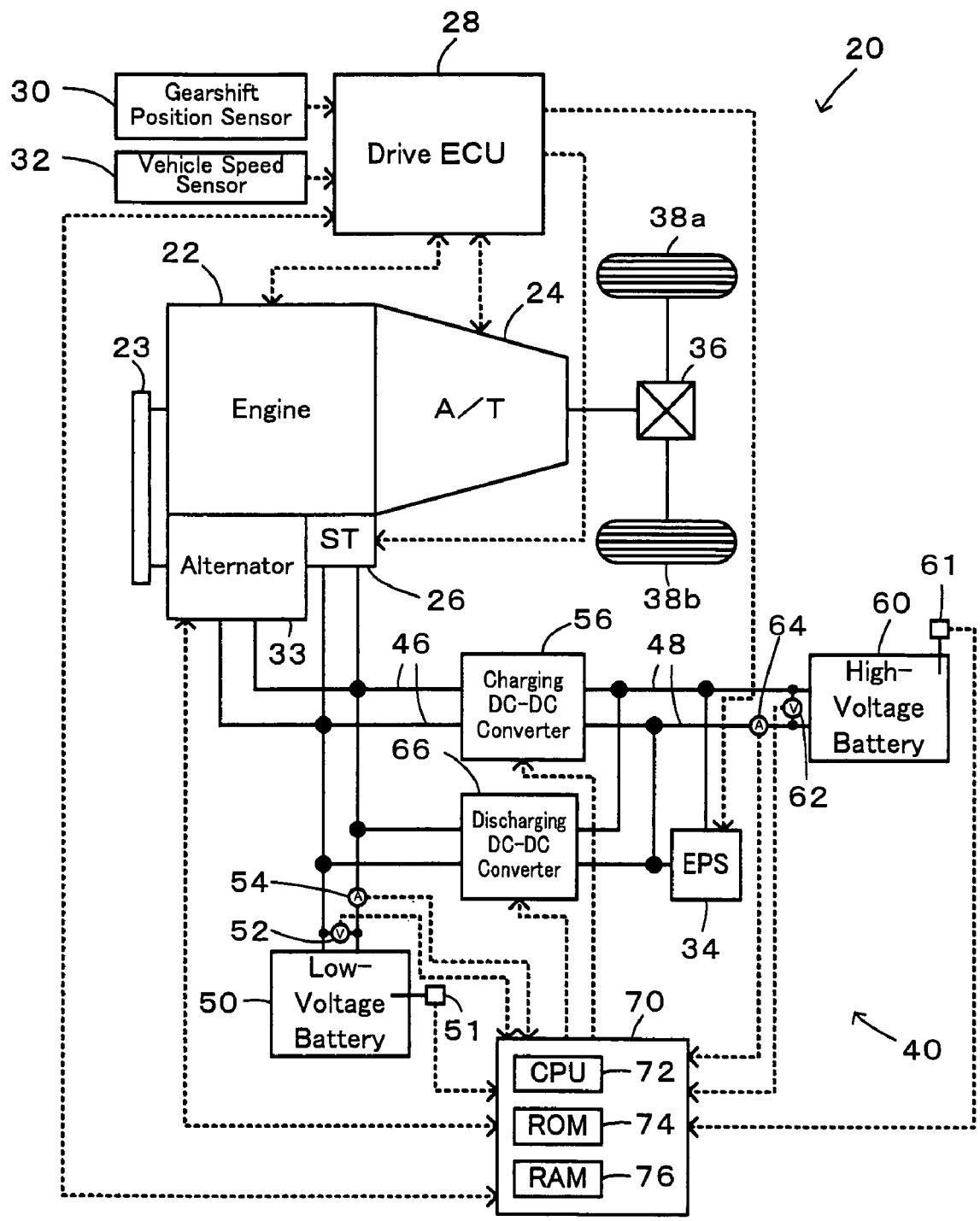
FIG. 1 schematically illustrates the configuration of a motor vehicle equipped with a power supply device in one embodiment of the invention.

One mode of carrying out the invention is discussed below as a preferred embodiment with reference to accompanied drawings. FIG. 1 schematically illustrates the configuration of a motor vehicle 20 equipped with a power supply device 40 in one embodiment of the invention. As illustrated in FIG. 1, the motor vehicle 20 of the embodiment includes an engine 22 that consumes gasoline as a fuel to output power, and an automatic transmission 24 that converts the output power of the engine 22 at one of multiple gear ratios and outputs the converted power to drive wheels 38a and 38b via a differential gear 36. The motor vehicle 20 of the embodiment also has a drive electronic control unit 28 (drive ECU 28) that controls the operations of the engine 22 and the automatic transmission 24, an alternator 33 that has a rotating shaft connected to a crankshaft of the engine 22 via a belt 23 and consumes the output power of the engine 22 to generate electric power, and the power supply device 40.

The drive ECU 28 is constructed as a microcomputer including a CPU, an input port, and an output port, which are not specifically illustrated in FIG. 1. The drive ECU 28 receives, via its input port, data required for controlling the operations of the engine 22 and the automatic transmission 24 from various sensors attached to the engine 22 and the automatic transmission 24. The input data include, for example, a gearshift position SP from a gearshift position sensor 30 and a vehicle speed from a vehicle speed sensor 32. The drive ECU 28 outputs, via its output port, diverse driving signals and control signals, for example, driving signals to a starter motor 26 for cranking the engine 22, driving signals to various actuators in the engine 22 and the automatic transmission 24, and driving signals to an electric power steering (EPS) 34.

The power supply device 40 includes a low-voltage battery 50, a high-voltage battery 60, and a power supply electronic control unit 70 that controls the operations of the whole power supply device 40. The low-voltage battery 50 is connected with the alternator 33 via low-voltage power lines 46 to be charged with the electric power generated by the alternator 33 and supplies electric power to the starter motor 26 and other auxiliary machinery. The high-voltage battery 60 is connected with the low-voltage power lines 46 via a charging DC-DC converter 56 and via a discharging DC-DC converter 66.

The low-voltage battery 50 and the high-voltage battery 60 are both secondary batteries but have different characteristics. The low-voltage battery 50 is, for example, a lead acid battery having a rated output voltage of 12V and quickly deteriorates in its state of charge SOC1 left at a low level. The high-voltage battery 60 is, for example, a lithium secondary battery having a rated output voltage of 36 V and quickly deteriorates in its state of charge SOC2 left at a high level. The lead acid battery used for the low-voltage battery 50 in the embodiment causes sulfation, on the other hand, when its state of charge SOC1 is kept at a high level. The sulfation represents accumulation of a sulfur compound on the surface of electrodes and worsens the battery performances. A discharging-charging cycle of the low-voltage battery 50 prevents such sulfation and ensures the good battery performances. The electric power steering (EPS) 34 is connected to the high-voltage power lines 48 linked to the high-voltage battery 60. The electric power steering (EPS) 34 accordingly receives a supply of electric power from the high-voltage system.

The power supply electronic control unit 70 is constructed as a microcomputer including a CPU 72, a ROM 74 that stores processing programs, a RAM 76 that temporarily stores data, input and output ports (not shown), and a communication port (not shown). The power supply electronic control unit 70 receives, via its input port, diverse signals and data required for control; for example, an alternator temperature Ta from a temperature sensor (not shown) attached to the alternator 33, an alternator rotation speed Na from a rotation speed sensor (not shown) attached to the alternator 33, a low-voltage battery temperature Tb1 from a temperature sensor 51 attached to the low-voltage battery 50, a low-voltage battery voltage Vb1 from a voltage sensor 52 located between output terminals of the low-voltage battery 50, a low-voltage battery electric current Ib1 from an electric current sensor 54 located on the power line 46 in the vicinity of the output terminals of the low-voltage battery 50, a high-voltage battery temperature Tb2 from a temperature sensor 61 attached to the high-voltage battery 60, a high-voltage battery voltage Vb2 from a voltage sensor 62 located between output terminals of the high-voltage battery 60, and a high-voltage battery electric current Ib2 from an electric current sensor 64 located on the power line 48 in the vicinity of the output terminals of the high-voltage battery 60. The power supply electronic control unit 70 outputs, via its output port, driving signals to the alternator 33, control signals to the charging DC-DC converter 56, and control signals to the discharging DC-DC converter 66. The power supply electronic control unit 70 establishes communication with the drive ECU 28 to send and receive data to and from the drive ECU 28 according to the requirements.

Figure 2:
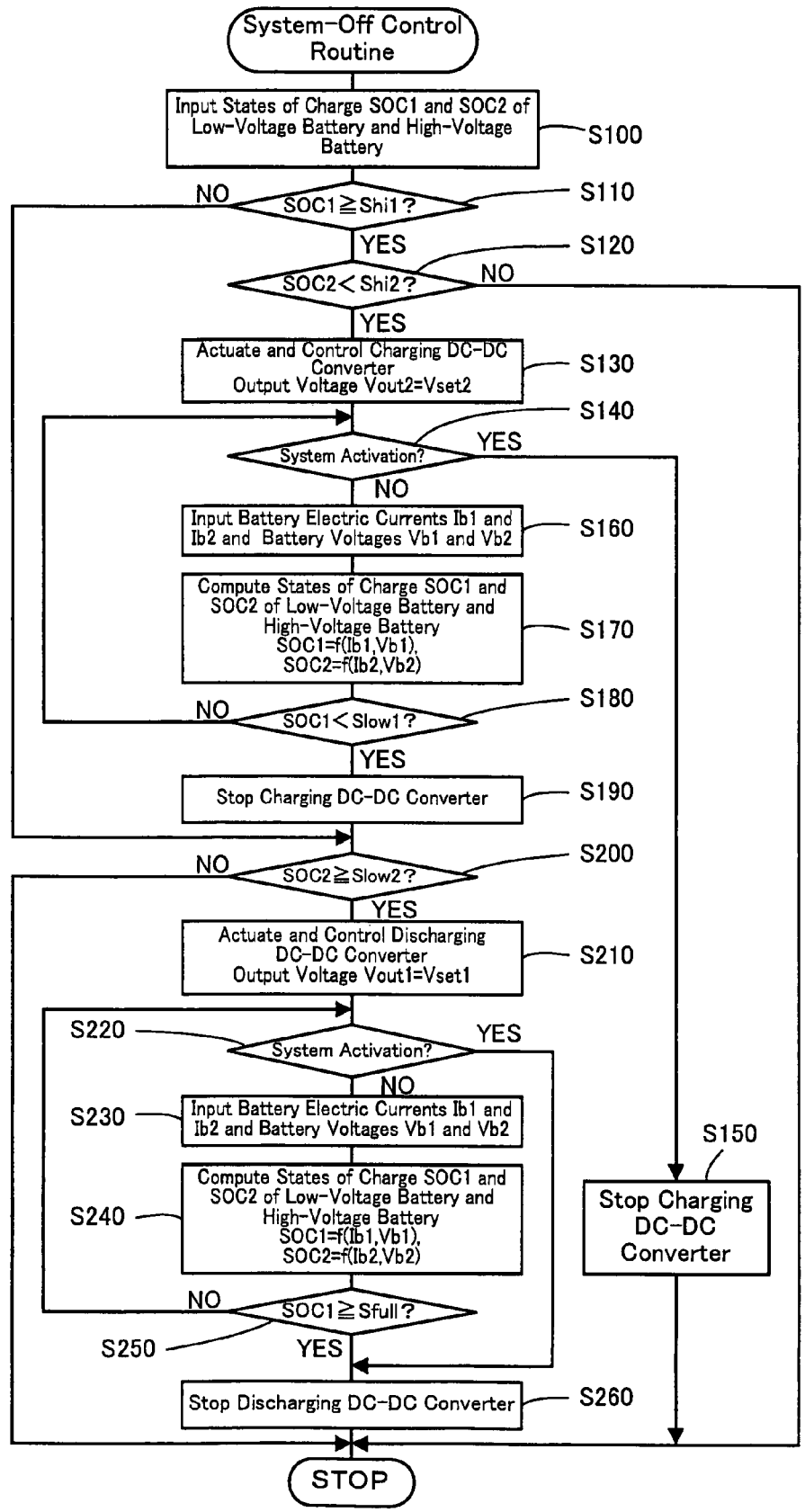
FIG. 2 is a flowchart showing a system-off control routine executed by a power supply electronic control unit included in the power supply device of FIG. 1.

The power supply device 40 of the embodiment constructed as discussed above performs some characteristic operations, especially a series of control at a system-off time in response to an ignition-off operation. FIG. 2 is a flowchart showing a system-off control routine executed by the power supply electronic control unit 70 of the power supply device 40 at a system-off time.

In the system-off control routine of FIG. 2, the CPU 72 of the power supply electronic control unit 70 first inputs the state of charge SOC1 of the low-voltage battery 50 and the state of charge SOC2 of the high-voltage battery 60 (step S100). The state of charge SOC1 of the low-voltage battery 50 and the state of charge SOC2 of the high-voltage battery 60 are computed from accumulated values of the low-voltage battery electric current Ib1 measured by the electric current sensor 54 and the high-voltage battery electric current Ib2 measured by the electric current sensor 64 according to a charge level computation routine (not shown) and are stored in the RAM 76. At step S100, the CPU 72 reads the computed state of charge SOC1 of the low-voltage battery 50 and the computed state of charge SOC2 of the high-voltage battery 60 from the storage of the RAM 76. The input state of charge SOC1 of the low-voltage battery 50 is compared with a discharging reference value Shi1, which is set to be lower than a full charge level (step S110).

Figure 3:
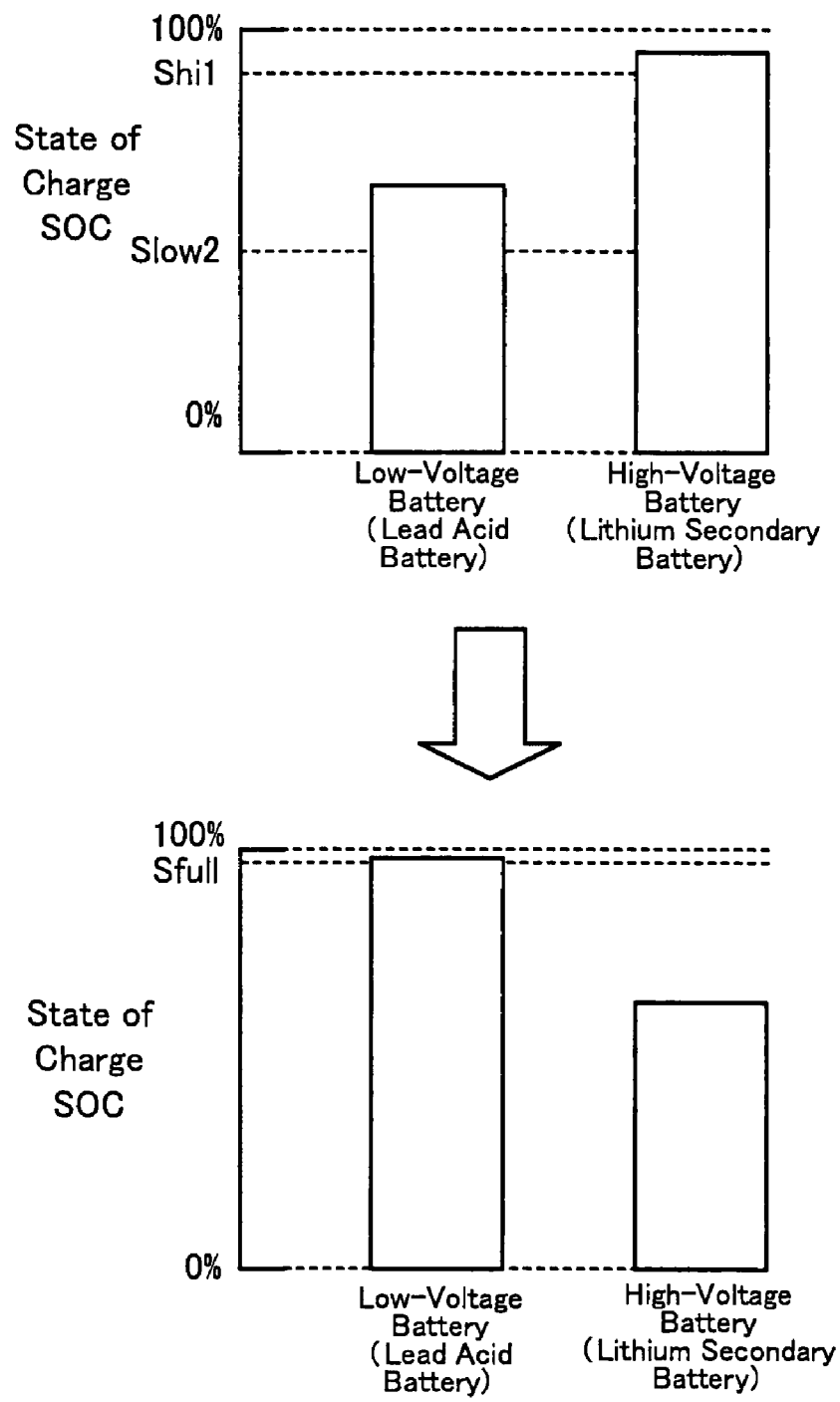
FIG. 3 shows variations in state of charge SOC1 of a low-voltage battery and in state of charge SOC2 of a high-voltage battery by the system-off control.

When the state of charge SOC1 of the low-voltage battery 50 is lower than the discharging reference value Shi1 at step S110, the input state of charge SOC2 of the high-voltage battery 60 is compared with a discharging reference value Slow2, which is set as a sufficient capacity for charging the low-voltage battery 50 (step S200). When the state of charge SOC2 of the high-voltage battery 60 is lower than the discharging reference value Slow2 at step S200, the CPU 72 specifies the current charge level of the high-voltage battery 60 as not sufficiently high for charging the low-voltage battery 50 and immediately exits from this system-off control routine without any further processing. When the state of charge SOC2 of the high-voltage battery 60 is not lower than the discharging reference value Slow2 at step S200, on the contrary, the CPU 72 actuates and controls the discharging DC-DC converter 66 to have an output voltage Vout1 equal to a charging voltage Vset1 specified as an appropriate voltage level for fully charging the low-voltage battery 50 (step S210). This starts charging the low-voltage battery 50 with the electric power supplied from the high-voltage battery 60. After the start of charging the low-voltage battery 50, under condition of no system activation by an ignition-on operation (step S220), the processing of steps S230 and S240 is repeated until the state of charge SOC1 of the low-voltage battery 50 reaches a charge stop reference value Sfull, which is set as a value sufficiently close to a full charge level (step S250). The CPU 72 inputs the low-voltage battery electric current Ib1 from the electric current sensor 54, the high-voltage battery electric current Ib2 from the electric current sensor 64, the low-voltage battery voltage Vb1 from the voltage sensor 52, and the high-voltage battery voltage Vb2 from the voltage sensor 62 (step S230) and computes the state of charge SOC of the low-voltage battery 50 and the state of charge SOC2 of the high-voltage battery 60 from the input low-voltage battery electric current Ib1 and the input low-voltage battery voltage Vb1 and from the input high-voltage battery electric current Ib2 and the input high-voltage battery voltage Vb2 (step S240). When the state of charge SOC of the low-voltage battery 50 reaches or exceeds the charge stop reference value Sfull at step S250, the CPU 72 stops the discharging DC-DC converter 66 (step S260) and exits from this system-off control routine. The low-voltage battery 50 is accordingly charged close to its full charge level. The lead acid battery used for the low-voltage battery 50 quickly deteriorates in the continuous low state of charge SOC1 as mentioned previously. Charging the low-voltage battery 50 close to its full charge level desirably prevents quick deterioration of the low-voltage battery 50. The high-voltage battery 60 is discharged to supply the electric power and charge the low-voltage battery 50. The state of charge SOC2 of the high-voltage battery 60 accordingly decreases from a sufficiently high charge level. As mentioned previously, the lithium secondary battery used for the high-voltage battery 60 quickly deteriorates in the continuous high state of charge SOC2. Discharging the high-voltage battery 60 from the sufficiently high charge level desirably prevents quick deterioration of the high-voltage battery 60. Namely this control flow enables both the low-voltage battery 50 and the high-voltage battery 60 to have the respective favorable states of charge with little potentials for deterioration and effectively prevents quick deterioration of both the low-voltage battery 50 and the high-voltage battery 60. FIG. 3 shows variations in state of charge SOC1 of the low-voltage battery 50 and in state of charge SOC2 of the high-voltage battery 60 by this control flow. In the event of system activation by an ignition-on operation (step S220) in the course of charging the low-voltage battery 50 before the state of charge SOC1 of the low-voltage battery 50 reaches the charge stop reference value Sfull (step S250), the CPU 72 immediately stops the discharging DC-DC converter 66 (step S260) and exits from the system-off control routine.

Figure 4:
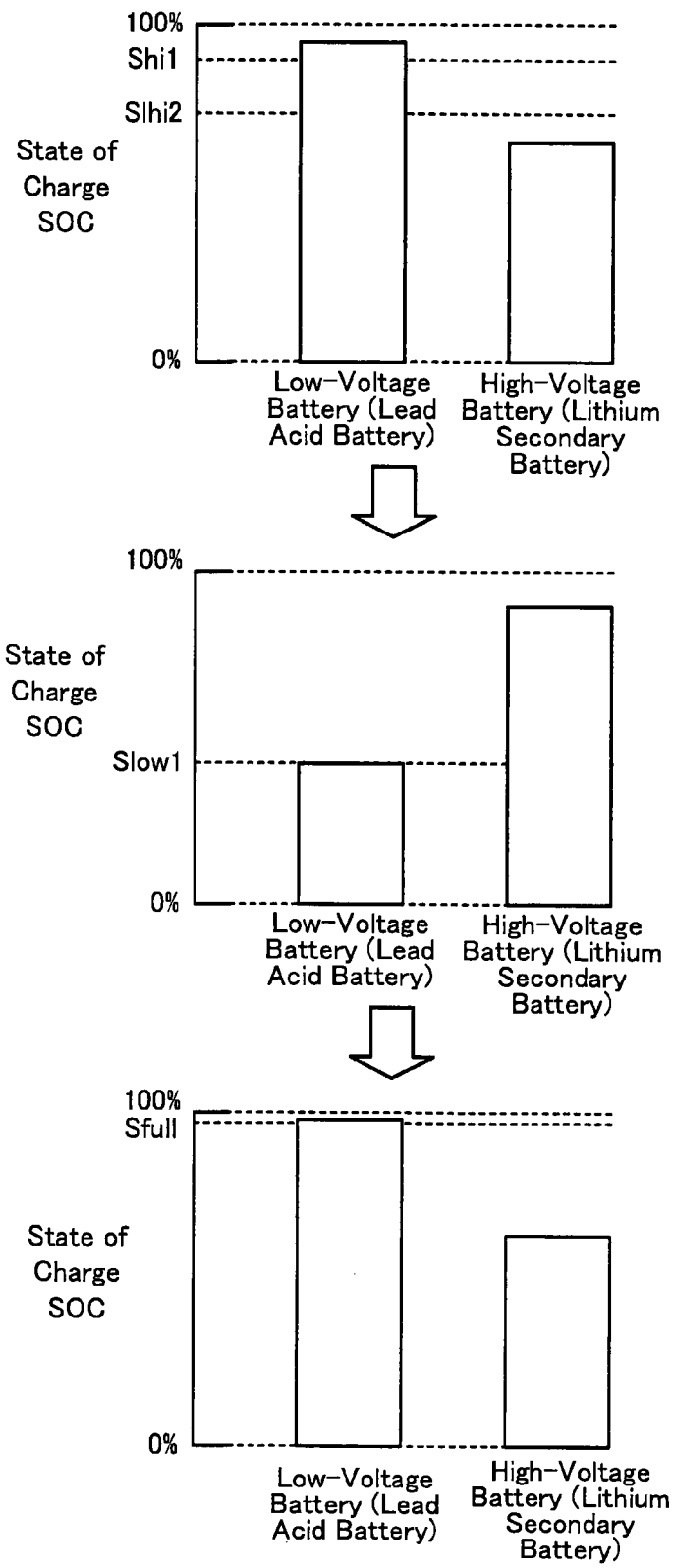
FIG. 4 shows variations in state of charge SOC1 of the low-voltage battery and in state of charge SOC2 of the high-voltage battery by the system-off control.

When the state of charge SOC1 of the low-voltage battery 50 is not lower than the discharging reference value Shi1 at step S110, on the other hand, the input state of charge SOC2 of the high-voltage battery 60 is compared with a charging reference value Shi2, which is set as a capacity to be sufficiently charged with discharge of the low-voltage battery 50 (step S120). When the state of charge SOC2 of the high-voltage battery 60 is not lower than the charging reference value Shi2 at step S120, the CPU 72 specifies the current charge level of the high-voltage battery 60 as not sufficiently low to be charged with discharge of the low-voltage battery 50 and immediately exits from this system-off control routine without any further processing. When the state of charge SOC2 of the high-voltage battery 60 is lower than the charging reference value Shi2 at step S120, on the contrary, the CPU 72 actuates and controls the charging DC-DC converter 56 to have an output voltage Vout2 equal to a charging voltage Vset2 specified as an appropriate voltage level for charging the high-voltage battery 60 (step S130). This starts charging the high-voltage battery 60 with the electric power supplied from the low-voltage battery 50. After the start of charging the high-voltage battery 60, under condition of no system activation by an ignition-on operation (step S140), the processing of steps S160 and S170 is repeated until the state of charge SOC1 of the low-voltage battery 50 decreases below a discharge stop reference value Slow1, which is set as a relatively small value (step S180). The CPU 72 inputs the low-voltage battery electric current Ib1 from the electric current sensor 54, the high-voltage battery electric current Ib2 from the electric current sensor 64, the low-voltage battery voltage Vb1 from the voltage sensor 52, and the high-voltage battery voltage Vb2 from the voltage sensor 62 (step S160) and computes the state of charge SOC1 of the low-voltage battery 50 and the state of charge SOC2 of the high-voltage battery 60 from the input low-voltage battery electric current Ib1 and the input low-voltage battery voltage Vb1 and from the input high-voltage battery electric current Ib2 and the input high-voltage battery voltage Vb2 (step S170). When the state of charge SOC1 of the low-voltage battery 50 decreases below the discharge stop reference value Slow1 at step S180, the CPU 72 stops the charging DC-DC converter 56 (step S190) and executes the processing of and after step S200. In this state, the high-voltage battery 60 has been charged with the electric power supplied from the low-voltage battery 50 and the state of charge SOC2 of the high-voltage battery 60 reaches or exceeds the discharging reference value Slow2 at step S200. The low-voltage battery 50 is thus charged close to its full charge level with the electric power supplied from the high-voltage battery 60. In the case that the state of charge SOC1 of the low-voltage battery 50 is close to its full charge level (that is, not lower than the discharging reference level Shi1) at a system-off time, the control flow discharges the low-voltage battery 50 and subsequently charges the low-voltage battery 50 close to its full charge level. The charging-discharging cycle of the low-voltage battery 50 effectively prevents the sulfation and ensures the good performances of the low-voltage battery 50. Such control is based on the characteristics of the lead acid battery used for the low-voltage battery 50. As mentioned previously, the lead acid battery continuously kept in the high state of charge SOC causes accumulation of a sulfur compound on the surface of electrodes (sulfation) and worsens the battery performances. The discharging-charging cycle prevents such sulfation and ensures the good performances of the lead acid battery. The control flow executes the processing of steps S210 through S260 to charge the low-voltage battery 50 close to its full charge level. Namely this control flow enables both the low-voltage battery 50 and the high-voltage battery 60 to have the respective favorable states of charge with little potentials for deterioration and effectively prevents quick deterioration of both the low-voltage battery 50 and the high-voltage battery 60. FIG. 4 shows variations in state of charge SOC1 of the low-voltage battery 50 and in state of charge SOC2 of the high-voltage battery 60 by this control flow. In the event of system activation by an ignition-on operation (step S140) in the course of charging the high-voltage battery 60 before the state of charge SOC1 of the low-voltage battery 50 decreases below the discharge stop reference value Slow1 (step S180), the CPU 72 immediately stops the charging DC-DC converter 56 (step S150) and exits from the system-off control routine.

In the power supply device 40 of the embodiment described above, when the state of charge SOC1 of the low-voltage battery 50 is lower than the discharging reference value Shi1 below the full charge level and when the state of charge SOC2 of the high-voltage battery 60 is not lower than the discharging reference value Slow2 at the system-off time, the low-voltage battery 50 is charged close to its full charge level with the electric power supplied from the high-voltage battery 60. The lead acid battery used for the low-voltage battery 50 has the high potential for deterioration in the continuously low state of charge SOC. The lithium secondary battery used for the high-voltage battery 60 has the high potential for deterioration in the continuously high state of charge SOC. The charge of the low-voltage battery 50 in combination with the discharge of the high-voltage battery 60 enables both the low-voltage battery 50 and the high-voltage battery 60 to have the respective favorable states of charge with little potentials for deterioration. Namely the system-off control of the embodiment effectively prevents quick deterioration of both the low-voltage battery 50 and the high-voltage battery 60.

In the power supply device 40 of the embodiment, when the state of charge SOC1 of the low-voltage battery 50 is not lower than the discharging reference value Shi1 below the full charge level and when the state of charge SOC2 of the high-voltage battery 60 is lower than the charging reference value Shi2 at the system-off time, the high-voltage battery 60 is charged with the electric power supplied from the low-voltage battery 50. The charge of the high-voltage battery 60 is continued until the state of charge SOC1 of the low-voltage battery 50 decreases below the discharge stop reference value Slow1. The low-voltage battery 50 is then charged close to its full charge level with the electric power supplied from the high-voltage battery 60. This discharging-charging cycle effectively prevents the sulfation (accumulation of a sulfur compound on the surface of electrodes in the low-voltage battery 50 having the state of charge SOC1 continuously kept at the high level) and ensures the good performances of the low-voltage battery 50.

In the power supply device 40 of the embodiment, when the state of charge SOC1 of the low-voltage battery 50 is not lower than the discharging reference value Shi1 below the full charge level and when the state of charge SOC2 of the high-voltage battery 60 is lower than the charging reference value Shi2 at the system-off time, the high-voltage battery 60 is charged with the electric power supplied from the low-voltage battery 50. The charge of the high-voltage battery 60 is continued until the state of charge SOC1 of the low-voltage battery 50 decreases below the discharge stop reference value Slow1. The low-voltage battery 50 is then charged close to its full charge level with the electric power supplied from the high-voltage battery 60. This discharging-charging cycle may not be required at every system-off time but may be performed at a rate of once per preset number of system-offs. The discharging-charging cycle may be omitted when not required.

The power supply device 40 of the embodiment enables both the low-voltage battery 50 and the high-voltage battery 60 to have the respective favorable states of charge and prevents quick deterioration of both the low-voltage battery 50 and the high-voltage battery 60. One possible modification gives preference to the low-voltage battery 50 over the high-voltage battery 60 and preferentially makes the low-voltage battery 50 have the favorable state of charge to prevent quick deterioration of the low-voltage battery 50. Another possible modification gives preference to the high-voltage battery 60 over the low-voltage battery 50 and preferentially makes the high-voltage battery 60 have the favorable state of charge to prevent quick deterioration of the high-voltage battery 60. It is desirable to give preference to a battery having a greater degree of deterioration.

In the power supply device 40 of the embodiment, the low-voltage battery 50 is charged by actuation of the discharging DC-DC converter 66, while being discharged by actuation of the charging DC-DC converter 56. The use of both the charging DC-DC converter 56 and the discharging DC-DC converter 66 is, however, not essential. The low-voltage battery 50 may be charged and discharged by actuation of only one DC-DC converter that enables simultaneous adjustment of both the voltage level on the low-voltage power lines 46 and the voltage level on the high-voltage power lines 48 and allows transmission of electric power between the low-voltage power lines 46 and the high-voltage power lines 48.

In the structure of the embodiment, the low-voltage power lines 46 are linked to the alternator 33 that receives the output power of the engine 22, generates electric power, and supplies the generated electric power to the power supply device 40. The alternator 33 may alternatively be linked to the high-voltage power lines 48.

The power supply device 40 of the embodiment includes the lead acid battery and the lithium secondary battery as the multiple secondary batteries having different characteristics, that is, as the low-voltage battery 50 and the high-voltage battery 60. The secondary batteries having different characteristics are not restricted to the combination of the lead acid battery and the lithium secondary battery but may be any other suitable combination of multiple secondary batteries. The number of the multiple secondary batteries included in the power supply device of the invention is not limited to 2 but may be 3 or more. Any number of multiple secondary batteries are arranged to enable a shift in charge level of each secondary battery to its favorable state of charge through transmission of electric power between the multiple secondary batteries.

The above embodiment regards the power supply device 40 mounted on the motor vehicle 20. The power supply device of the invention may be mounted on any of diverse moving bodies including automobiles, other vehicles, ships and boats, and aircraft or may be incorporated in any of diverse stationary systems including construction equipment. The technique of the invention may also be actualized by a control method of a power supply device that includes multiple secondary batteries having different characteristics.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the present invention is preferably applicable to the manufacturing industries of power supply devices.

The invention claimed is:

1. A power supply device incorporated in a system and receives a supply of electric power from the system and supplies electric power to a system electric power-consuming apparatus, said power supply device comprising:
   a first battery that is chargeable and dischargeable and has a first characteristic which is quick deterioration in a low state of charge having a low level of dischargeable electric power;
   a second battery that is chargeable and dischargeable and has a second characteristic which is quick deterioration in a high state of charge having a high level of dischargeable electric power;
   a voltage adjustment structure that adjusts a first voltage as a voltage of a first voltage system connected with the first battery and a second voltage of a second voltage system connected with the second battery;
   a first state of charge computation module that computes a first state of charge as a dischargeable electric power from the first battery based on the state of the first battery;
   a second state of charge computation module that computes a second state of charge as a dischargeable electric power from the second battery based on the state of the second battery; and
   a control module that, when the system is off, under condition that the computed first state of charge is less than a first predetermined state of charge which is lower than a state of charge at a full charge level and the computed second state of charge is more than a second predetermined state of charge which is chargeable of the first battery, controls said voltage adjustment structure to cause the state of charge of the first battery to become more than the first predetermined state of charge by transmission of electric power between the first battery and the second battery.

2. A power supply in accordance with claim 1, wherein the first battery is a battery that has a characteristic which a battery performance is regenerated by shifting a high state of charge having a high level of dischargeable electric power and a low state of charge having a low level of dischargeable electric power, and
   said control module that, when the system is off, under condition that the computed first state of charge is more than the first predetermined state of charge and the second state of charge is more than a third predetermined state of charge which is acceptable of electric power from the first battery, controls said voltage adjustment structure to cause the state of charge of the first battery to become more than the first predetermined state of charge after the state of charge of the first battery becomes a forth predetermined state of charge that is a high state of charge having a low level of dischargeable electric power by transmission of electric power between the first battery and the second battery.

3. A power supply device in accordance with claim 1, wherein the first battery is a lead acid battery; and
   the second battery is a lithium secondary battery.

4. A motor vehicle, comprising:
   an internal combustion engine;
   a generator that consumes output power of the internal combustion engine and generates electric power; and
   a power supply device that receives a supply of the electric power generated by the generator and supplies electric power to an electric power-consuming apparatus equipped on the motor vehicle, said power supply device comprising: a first battery that is chargeable and dischargeable and has a first characteristic which is quick deterioration in a low state of charge having a low level of dischargeable electric power; a second battery that is chargeable and dischargeable and has a second characteristic which is quick deterioration in a high state of charge having a high level of dischargeable electric power; a voltage adjustment structure that adjusts a first voltage as a voltage of a first voltage system connected with the first battery and a second voltage as a voltage of a second voltage system connected with the second battery; a first state of charge computation module that computes a first state of charge as a dischargeable electric power from the first battery based on the state of the first battery; a second state of charge computation module that computes a second state of charge as a dischargeable electric power from the second battery based on the state of the second battery; and a control module that, when the vehicle is system-off, under condition that the computed first state of charge is less than a first predetermined state of charge which is lower than a state of charge at a full charge level and the computed second state of charge is more than a second predetermined state of charge which is chargeable of the first battery, controls said voltage adjustment structure to cause the state of charge of the first battery to become more than the first predetermined state of charge by transmission of electric power between the first battery and the second battery.

5. A control method of a power supply device incorporated in a system and receives a supply of electric power from the system and supplies electric power to a system electric power-consuming apparatus, said power supply device comprising:
   a first battery that is chargeable and dischargeable and has a first characteristic which is quick deterioration in a low state of charge having a low level of dischargeable electric power;
   a second battery that is chargeable and dischargeable and has a second characteristic which is quick deterioration in a high state of charge having a high level of dischargeable electric power;
   a voltage adjustment structure that adjusts a first voltage as a voltage of a first voltage system connected with the first battery and a second voltage as a voltage of a second voltage system connected with the second battery,
   under condition that, when the system is off, a first state of charge as dischargeable electric power from the first battery based on the state of the first battery is less than a first predetermined state of charge which is lower than a state of charge at a full charge level and a second state of charge as dischargeable electric power from the second battery based on the state of the second battery is more than a second predetermined state of charge which is chargeable of the first battery, controls said voltage adjustment structure to cause the state of charge of the first battery to become more than the first predetermined state of charge by transmission of electric power between the first battery and the second battery.

* * * * *